INVENTORS
O. B. ANDERSON
D. W. AULD
BY Hudson, Young, Shanley & Yinger
ATTORNEY

Oct. 26, 1943.   D. W. AULD ET AL   2,332,685
TUBING MAKE-UP DEVICE
Filed April 25, 1941   2 Sheets-Sheet 2

INVENTORS
O. B. ANDERSON
D. W. AULD
BY Hudson, Young, Shanley + Yinger
ATTORNEY

Patented Oct. 26, 1943

2,332,685

UNITED STATES PATENT OFFICE 2,332,685

TUBING MAKE-UP DEVICE

Donald W. Auld, San Antonio, Tex., and Olof B. Anderson, Marquette, Mich., assignors of one-half to Phillips Petroleum Company, a corporation of Delaware, and one-half to E. J. Longyear Company, a corporation of Delaware Application April 25, 1941, Serial No. 390,408

1 Claim. (Cl. 255—35)

This invention relates to an improved device for making up tubing strings to be used in wells.

One of the objects of this invention is to provide a device which will expedite the making of joints in tubing for well holes.

Another object of this invention is to provide a device in which rotary power is applied to a tubing joint to make the same without danger of damaging the threads of the joint.

A further object of this invention is to provide a power operated chuck mechanism for imparting rotary motion to a tubing string.

Figure 1:
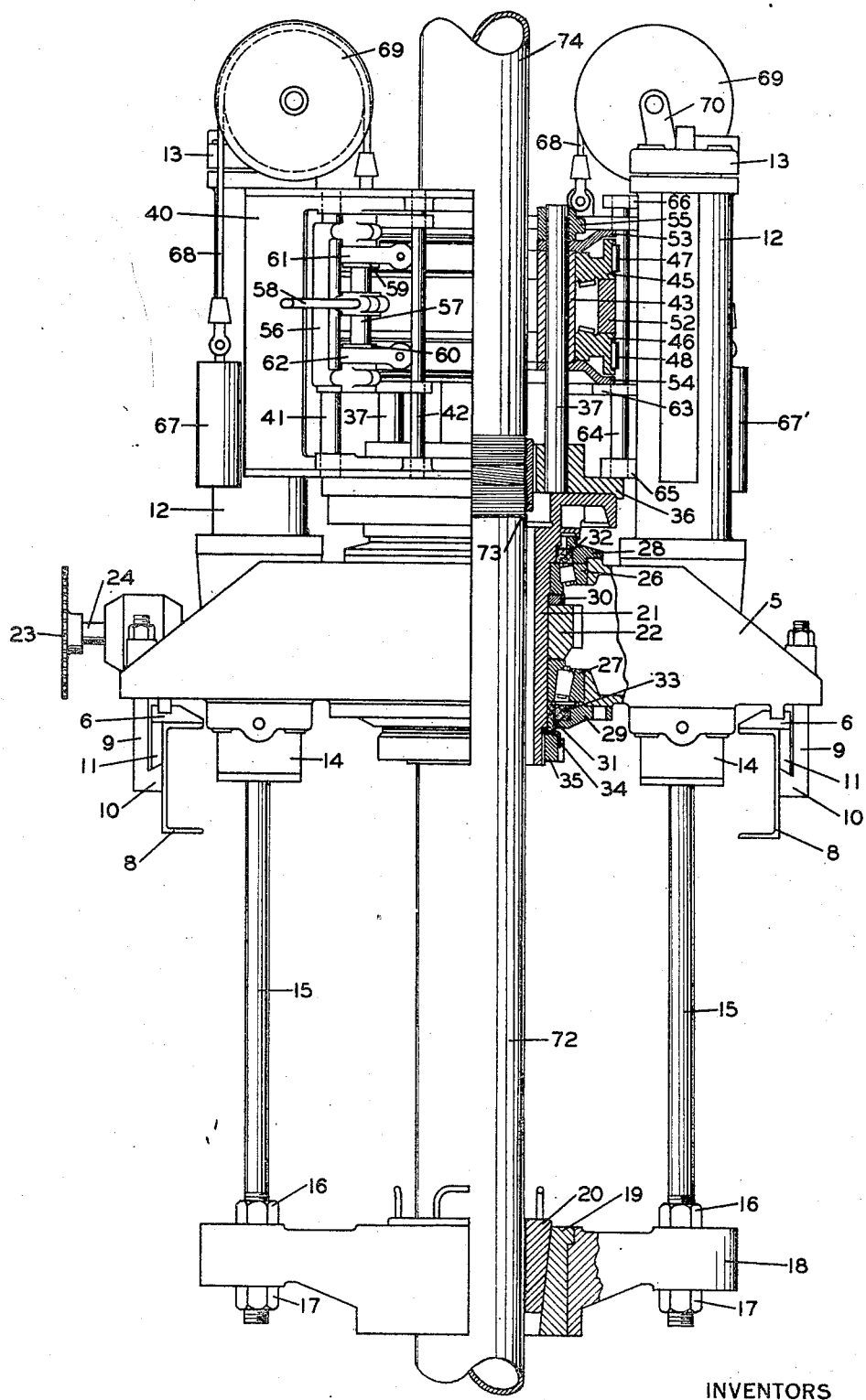
Figure 3:
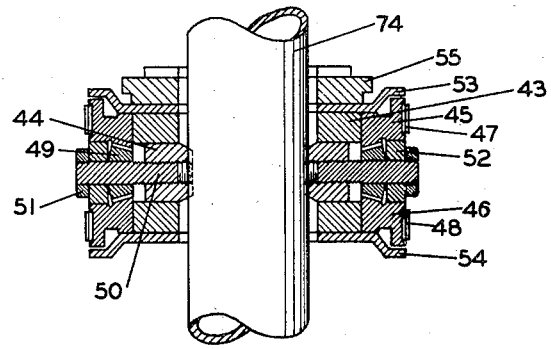
Figure 2:
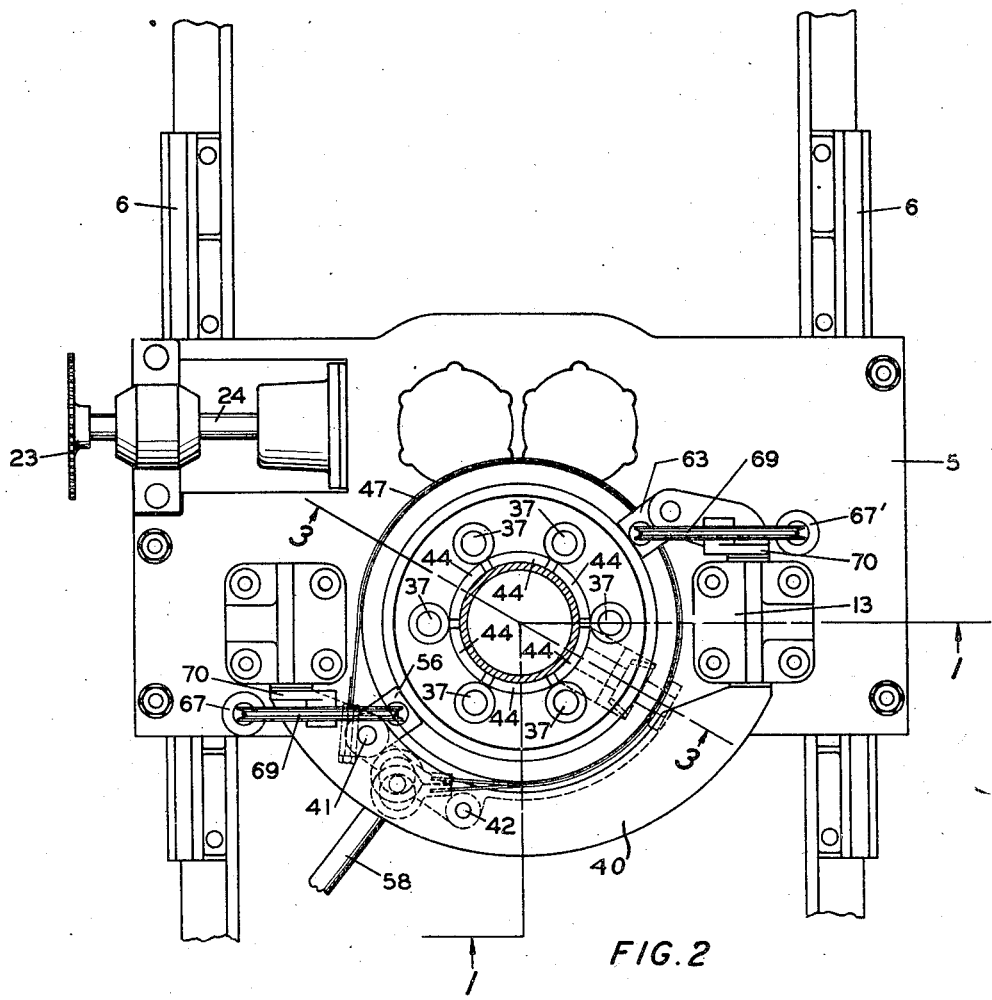

In the accompanying drawings forming a part of this specification and in which like numerals are applied to designate like parts throughout the several views, Figure 1 is a view partly in elevation and partly in section of a preferred embodiment of this invention, Figure 2 is a plan view of a preferred embodiment of this invention, and Figure 3 is a sectional view along the plane 3—3 of Figure 2 showing the chuck mechanism forming a part of this invention.

Referring to the drawings, a base plate 5 is slidably mounted upon a pair of tracks 6, 6 which are firmly bolted to ship channels 8, 8 of a suitable truck or trailer. Base plate 5 is held securely in position by bolts 9 having a hooked portion 10 which engages a hook rail 11 attached to the ship channels in any suitable manner. The base plate 5 carries two hydraulic cylinders 12, 12 having cylinder heads 13, 13 at one end and stuffing boxes 14, 14 at the other, sealingly engaging piston rods 15, 15. Fixed to the free end of piston rods 15, 15 by nuts 16, 16 and 17, 17 is a crosshead 18 having a centrally disposed opening to receive spider 19 and spider slips 20. Base plate 5 also carries a rotary table comprising a drive quill 21 driven by a drive quill gear 22. Power from a prime mover is supplied to a sprocket gear 23 on shaft 24 which transmits the power to drive quill gear 22 through a set of reduction gears, not shown in the drawings, housed in base plate 5. The drive quill is supported above and below the drive quill gear by roller bearings 26 and 27, respectively, held in place by an upper bearing retainer 28 and a lower bearing retainer 29. These bearings are held in spaced relation to the drive quill gear by an upper bearing spacer 30 and a lower bearing spacer 31. Lubricant is supplied to the bearings by suitable grease retainers 32 and 33. The rotary table assembly is completed by a lock washer 34 and lock nut 35 on the lower portion of the drive quill. A drive plate 36 carrying six drive rods 37 is carried and driven by the rotary table.

A bracket member 40 carrying a pair of rods 41 and 42 is attached to the cylinders 12, 12. Drive rods 37 serve to drive an automatic chuck mechanism comprising an inner drive ring 43 containing a set of six movable jaws 44. Concentric with the inner drive ring are a pair of beveled ring gears 45 and 46 having flanges formed on their outer peripheries to cooperate with lined brake bands 47 and 48. A set of six jaw-operating pinions 49 are in toothed engagement with the ring gears and serve to actuate the jaws. Each pinion is attached to a pinion shaft 50, externally threaded at one end to engage an internally threaded portion of jaw 44 and externally threaded at the opposite end to receive a lock nut 51. A retaining ring 52 serves as a retainer for the pinions and provides a bearing surface for the pinion shafts. Ring gears 45 and 46 are held in position by a pair of guide flanges 53 and 54 which are attached to the inner drive ring 43. Secured to the upper end of the drive rods is a top drive rod plate 55. Power from the rotary table is transmitted to the automatic chuck mechanism by the six drive rods which extends upwardly through the guide flanges and inner drive ring and terminate in the top drive rod plate. The chuck mechanism is free to move vertically with respect to the drive rods. A guide member 56, slidably mounted on a pair of rods 41 and 42 carries a brake eccentric shaft 57 and a brake operating lever 58. Brake eccentric shaft 57 has a pair of oppositely disposed eccentrics 59 and 60 formed thereon which cooperate with brake eccentric straps 61 and 62 attached to the ends of lined brake bands 47 and 48, respectively. A mechanism guide 63 is slidably mounted on a rod 64 which is held in position at its ends by a pair of brackets 65 and 66 secured to one of the cylinders. Counterweights 67 and 67' are connected to the guide member 56 and the mechanism guide 63, respectively, by cables 68, 68 passing over counterweight sheaves 69, 69. The counterweight sheaves are carried by sheave brackets 70, 70 attached to the cylinders 12, 12. The counterweights are sufficient in size and weight to raise the chuck mechanism to its uppermost position when the movable jaws of the chuck are not in engagement with tubing.

In the drawings, a section of tubing 72 with a coupling 73 on one end is shown passing through drive quill 21 and engaged by spider slips 20. A second section of tubing 74 is shown with one end in threaded engagement with the coupling on tubing section 72. Tubing section 74 passes through the chuck mechanism and is engaged by movable jaws 44.

In operation, sections of tubing to be made up into a tubing string are fed to the tubing make-up device by an elevator, not shown in the drawings. While the tubing string is supported by the elevator, spider slips 20 are removed from the spider 19 and crosshead 18 is raised by means of the hydraulic cylinders to its uppermost position with respect to base plate 5. The tubing is then lowered through the central opening in the chuck mechanism and the drive quill until the coupling at the upper end of the tubing string is in a position immediately above the top drive rod plate 55. Spider slips 20 are then inserted into the spider 19 to support the tubing string. The elevator may then be unclamped and used to pick up another section of tubing. Crosshead 18 is lowered by the hydraulic cylinders, bringing tubing section 72 and its attached coupling 73 into the position shown in Figure 1. The next section of tubing 74 is lowered by the elevator through the central opening of the chuck mechanism until its threads are in position for engagement with the threads of coupling 73. The rotary table may then be started or, if desired, it may be run continuously during the operation of making up a complete tubing string. The rotation of the rotary table is in a clockwise direction. Brake operating lever 58 is moved to tighten the lined brake band 48 about the outer periphery of the lower ring gear 46. It is to be noted that, since the eccentrics 59 and 60 are oppositely disposed on the brake eccentric shaft 57, either of the lined brake bands may be tightened about its corresponding ring gear independently of the other by movement of the brake operating lever in the proper direction. The action of the brake stops rotation of the lower ring gear 46 and causes pinions 49 to roll along the ring gear, rotating pinion shafts 50 and causing movable jaws 44 to be moved toward tubing 74 by coaction of the external threads of the shafts and the internal threads of the movable jaws. The six pinions operating simultaneously force the six movable jaws into engagement with the tubing to grasp it firmly. Power transmitted to the chuck mechanism by the drive rods 37 rotates the tubing section 74 in a clockwise direction, thereby making up the coupling joint. As the threaded portion of the tubing section 74 is screwed into the internally threaded coupling 73, the chuck mechanism follows the lead of the thread, since the construction of the unit is such as to allow freedom of vertical movement. When the joint is made, the brake operating lever 58 is moved to tighten the lined brake band 47 about the upper ring gear 45 to stop the rotation of the ring gear. Pinions 49 then roll along the upper ring gear 45, rotating the pinion gear shafts 50 and causing the movable jaws 44 to be retracted which releases the tubing section from the chuck mechanism. The action of the counterweights 67 and 67' then returns the chuck mechanism to its limiting position in an upward direction or to the position shown in Figure 1, after which the cycle of operations is repeated until a string of tubing of the desired length is made up.

It will be apparent to those skilled in the art that the device may be used for rotary drilling by merely removing the spider slips 20 and that it may be readily converted into a rotary drilling apparatus by substituting a chuck for spider 19 and spider slips 20 and providing slips in the drive quill to hold the kelley or grief stem.

Throughout the specification, the term tubing is intended to include casing, drill pipe, or solid rods, all of which may be readily made up into string by the use of my invention.

Various changes may be made in the size, shape, and relative position of parts without departing from the spirit of our invention as expressed in the accompanying claim forming a part of this specification.

We claim:

In a tubing make-up device, a chuck mechanism comprising a drive ring, movable jaws in said drive ring for engaging a section of tubing, pinion gears in threaded engagement with the movable jaws for moving the jaws into and out of engagement with the tubing, a ring gear engaging the pinion gears on one side, a second ring gear engaging the pinion gears on the opposite side, braking surfaces on the ring gears, braking means arranged for engagement with the braking surfaces to selectively arrest the motion of either ring gear relative to said drive ring, and driving means for imparting rotary motion to said drive ring, said drive ring being slidably connected to said driving means and free to move relative thereto along the axis of rotation.

DONALD W. AULD.
OLOF B. ANDERSON.